United States Patent [19]

Huckabee et al.

[11] 4,323,989
[45] Apr. 6, 1982

[54] WIDE SEISMIC SOURCE

[75] Inventors: Kermit D. Huckabee, Mandeville, La.; James C Adair, Bellaire; Gene T. Worrell, Houston, both of Tex.

[73] Assignee: Shell Oil Company, Houston, Tex.

[21] Appl. No.: 154,241

[22] Filed: May 29, 1980

[51] Int. Cl.³ ............................................. G01V 1/38
[52] U.S. Cl. ..................................... 367/17; 181/114; 181/118; 367/153
[58] Field of Search ..................... 367/16, 17, 19, 20, 367/23, 24, 153, 154, 165, 173; 181/114, 118; 114/242, 244, 245, 253, 254

[56] References Cited

U.S. PATENT DOCUMENTS

| 2,652,550 | 9/1953 | Lash | 367/16 |
|---|---|---|---|
| 3,331,050 | 7/1967 | Kilmer et al. | 367/24 |
| 3,414,874 | 12/1968 | McLoad | 367/20 |
| 3,479,638 | 11/1969 | Rusnak | 367/24 |
| 3,491,848 | 1/1970 | Giles | 367/17 |
| 3,581,273 | 5/1971 | Hedberg | 367/17 |
| 3,744,021 | 7/1973 | Todd | 367/23 |
| 3,818,440 | 6/1974 | Dransfield | 367/173 |
| 3,953,826 | 4/1976 | Brundrut et al. | 367/154 |
| 4,033,278 | 7/1977 | Waters | 367/17 |
| 4,063,213 | 12/1977 | Itria et al. | 367/17 |
| 4,087,780 | 5/1978 | Itria et al. | 367/17 |

FOREIGN PATENT DOCUMENTS

| 18053 | 10/1980 | European Pat. Off. | 367/17 |
|---|---|---|---|
| 826932 | 1/1960 | United Kingdom | 367/153 |

*Primary Examiner*—Nelson Moskowitz

[57] ABSTRACT

A wide seismic source for use in marine surveys comprising at least two arrays of seismic sources disposed to be towed in a spaced parallel arrangement. Each array includes an elongated float having discrete seismic sources mounted thereon and provided with a steering means to maintain the float in the desired lateral position.

13 Claims, 8 Drawing Figures

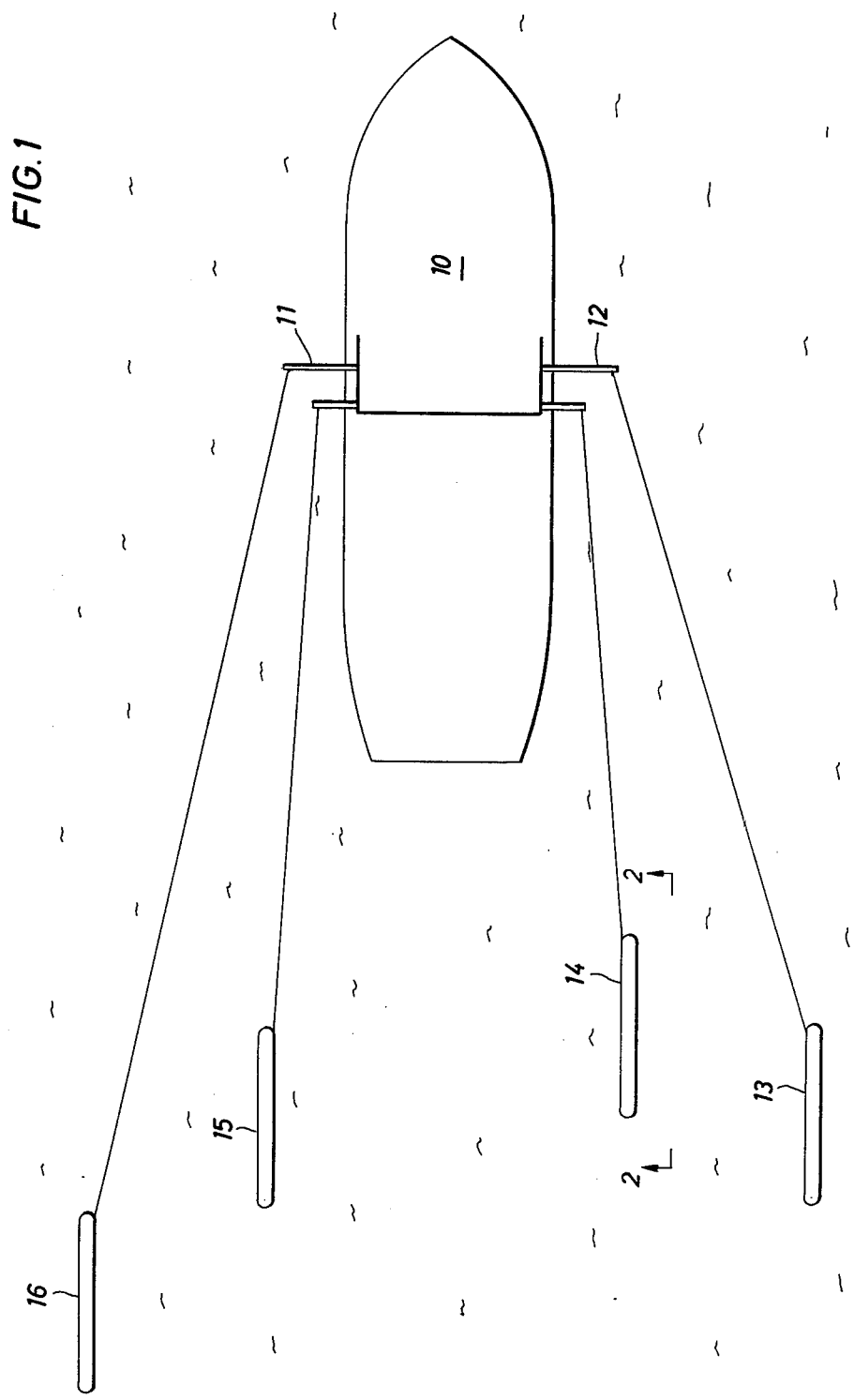

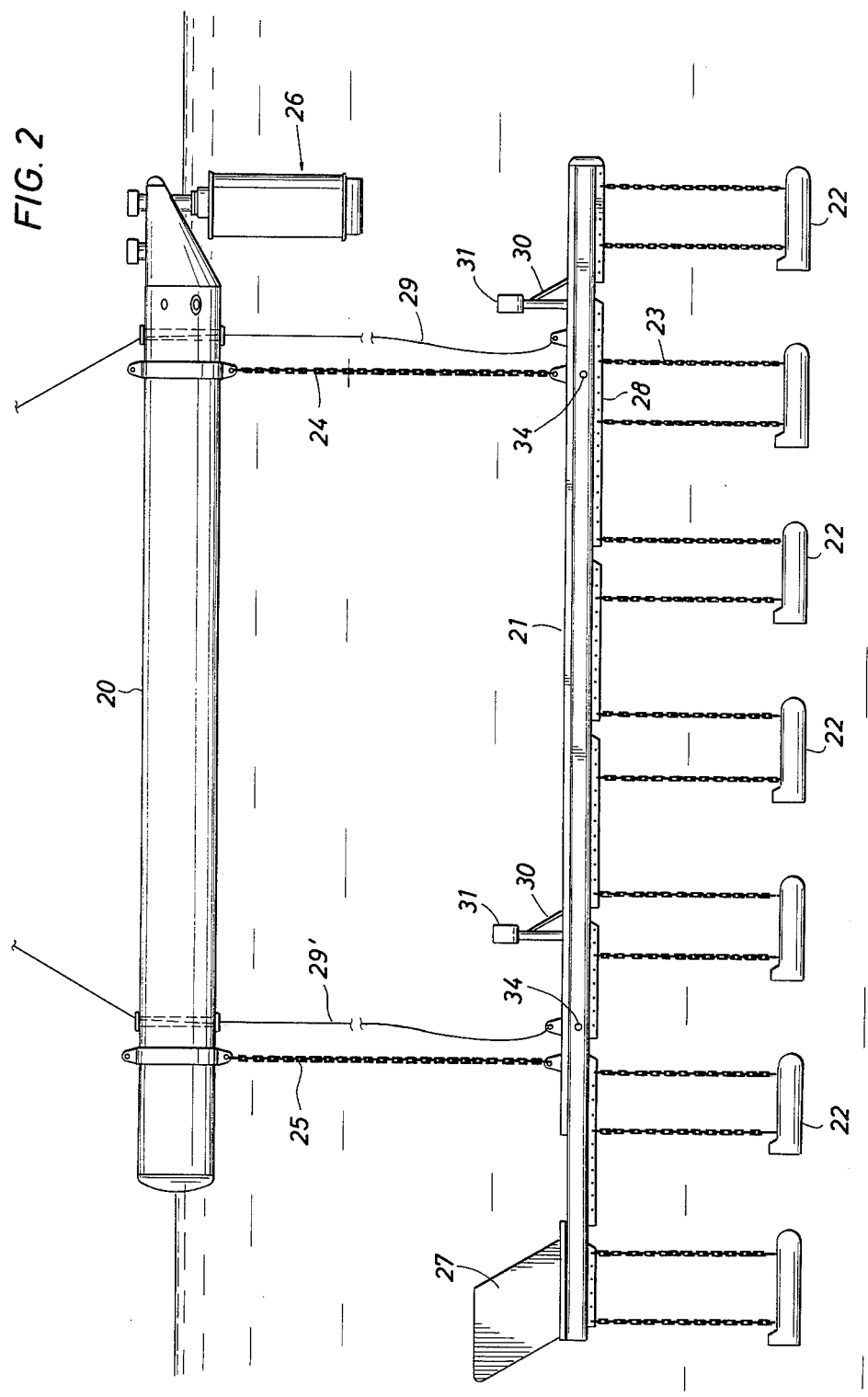

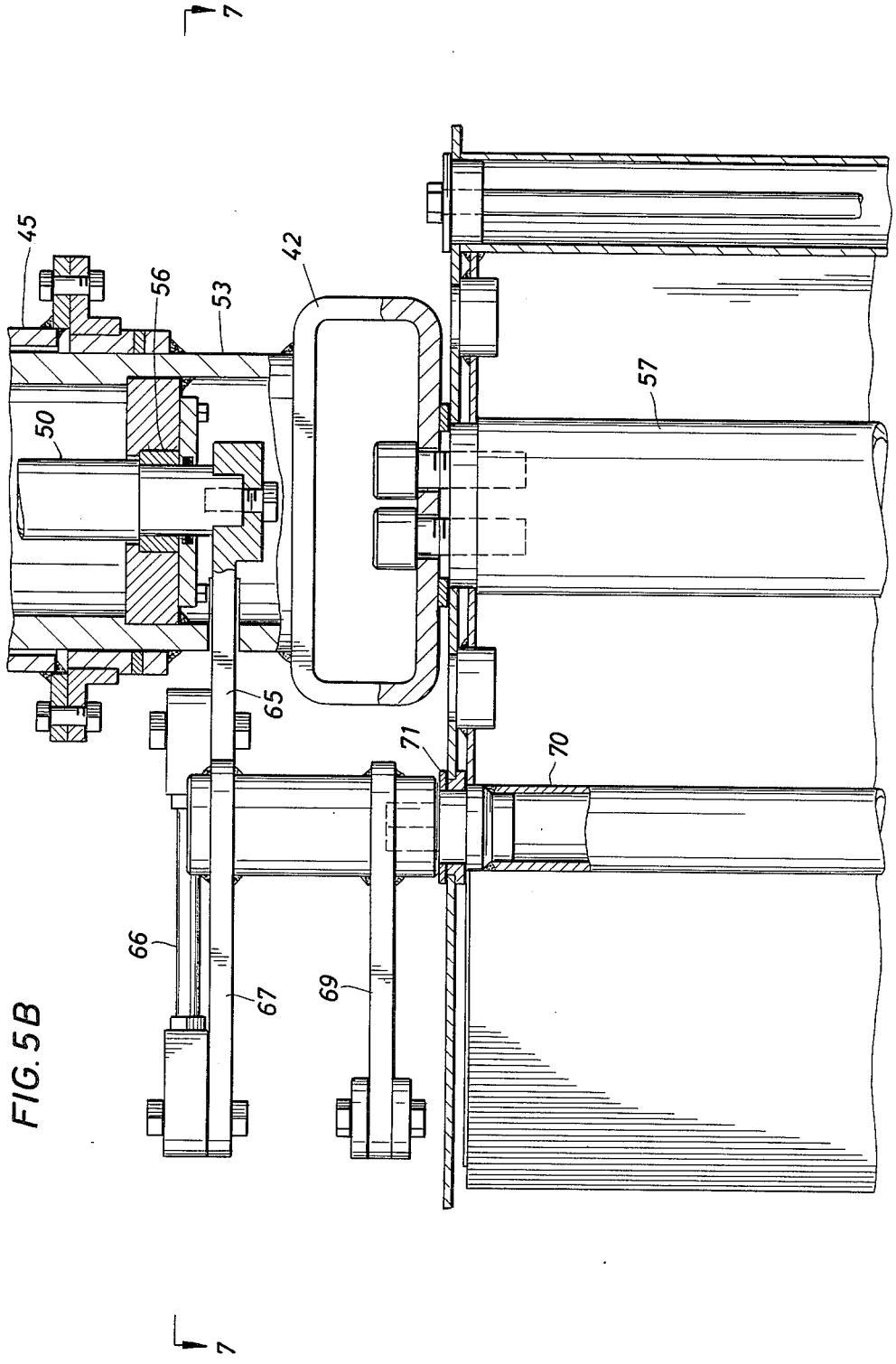

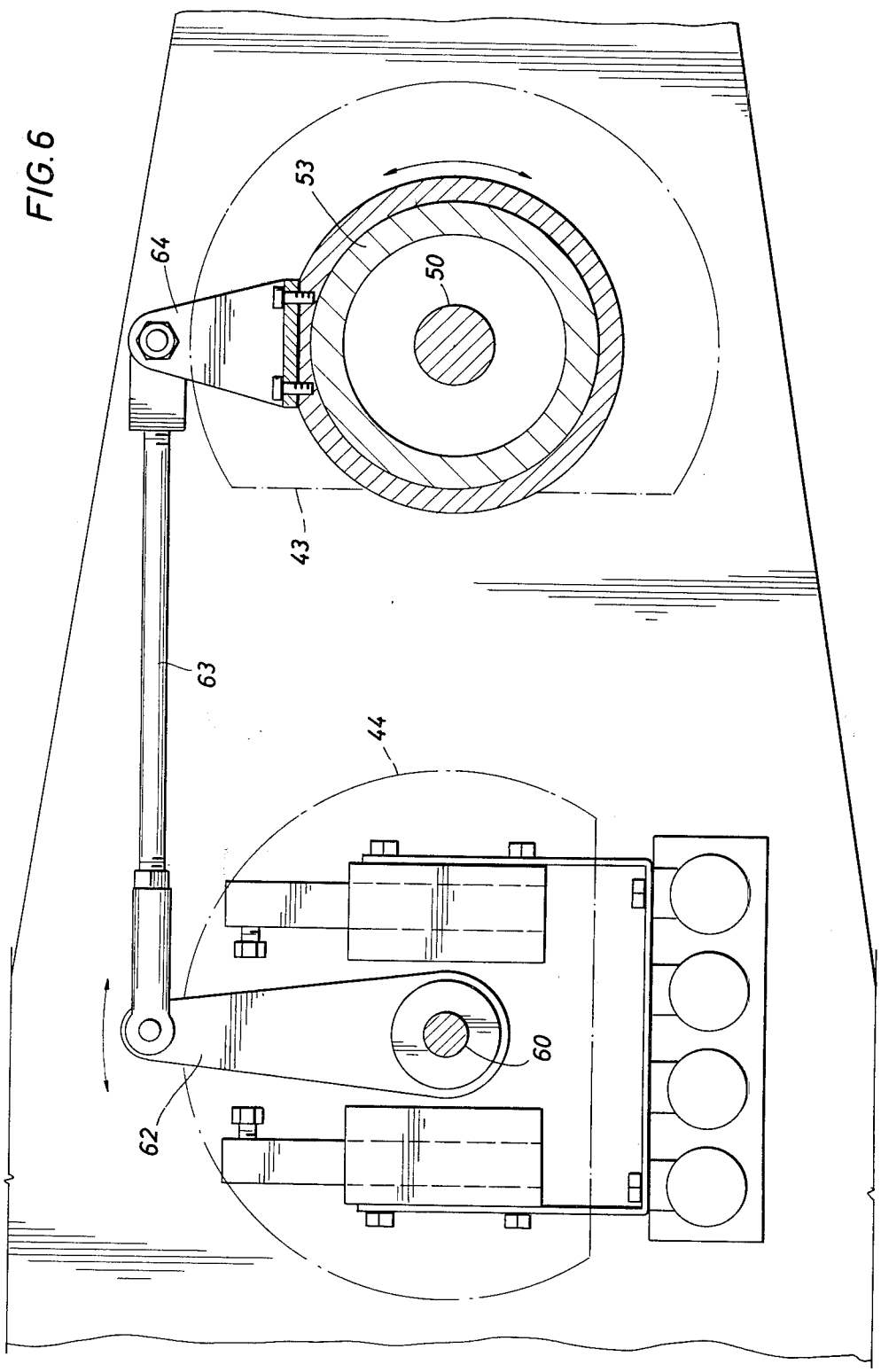

1

WIDE SEISMIC SOURCE

BACKGROUND OF THE INVENTION

The present invention relates to marine seismic exploration and more particularly to a sound source for conducting marine seismic explorations.

A common problem in marine seismic exploration is reception of horizontally travelling noise by the hydrophones in the marine streamer towed behind a survey vessel. The horizontally travelling noise is created by the seismic waves produced by the sound source striking features on the ocean floor and being reflected back to the hydrophones in the marine streamer. A suggested solution to this problem is contained in U.S. Pat. No. 3,491,848. This patent suggests that an array of seismic sources to streamed behind the exploration vessel with the sources being spaced apart in both the cross-line and in-line planes. In this manner, horizontally travelling noise signals of predetermined wave lengths arrive at the hydrophones as a result of sources disposed to one side of the marine streamer will be out of phase with horizontally travelling noise arriving as a result of sources disposed on the opposite side. The recorded data then is a composite of the desired seismic signal and the noise signals, which are reduced, since they are out of phase.

The above mentioned patent suggests various configurations and horizontal dispositions of sound sources for reducing or cancelling horizontally travelling noise. In all of the configurations the sources are attached to individual floats with the floats being secured to a tow cable. When one or more of the sources fail, the amplitude, frequency and direction of the seismic waves produced by the sources changes. These characteristics of the sources are normally referred to as the signature of the source. The signature of the source is determined from tests and used in deconvolving the recorded data to remove the effects of the source from the data. Any changes in the signature during the survey will produce errors in the processed data. Since the sources in the patent are connected to a common tow cable and disposed in particular configurations it is impossible to compensate or correct the source signature when one or more of the individual sources fail.

BRIEF DESCRIPTION OF THE INVENTION

The present invention solves the above problems by providing a wide seismic source for use in marine exploration utilizing a plurality of individual arrays. Each array comprises a plurality of sources which are suspended from an elongated float which is towed behind the survey vessel. Each float is equipped with steering means which permits the floats to be towed along a desired path. The steering means includes two rudders that are provided with trailing edge flaps that can be positioned to increase the horizontal force of the rudders. The force can be used to tow the outermost arrays a considerable distance to either side of the course of the towing vessel. In addition, the rudders have a foil shape that produces a large horizontal force at low velocities without excessive drag or turbulence.

While any number of arrays could be utilized, it is preferable to use at least four arrays to permit positioning two arrays on either side of the marine streamer which is towed directly behind the survey vessel. The horizontal separation of the two innermost arrays is determined by outriggers on the survey vessel in combination with the rudders while the two outer arrays are towed in their proper position by utilizing the rudders. The use of passive rudders requires only a means for rotating the rudder while active systems such as a propeller thruster requires considerable power. The combination of the two rudders and trailing edge flaps make it possible to tow the outermost floats along a desired course and maintain the proper spacing between the inner and outer arrays. The system is also compact enough to permit storage of the arrays on the survey vessel.

BRIEF DESCRIPTION OF THE DRAWINGS

The present invention will be more easily understood from the following detailed description of a preferred embodiment when taken in conjunction with the attached drawings in which:

FIG. 1 is a plan view of a survey vessel towing four seismic arrays.

FIG. 2 is an elevation view of one of the arrays shown in FIG. 1.

FIGS. 5(A) and 5(B) are a vertical section through the rudder control and flap control mechanism of the array shown in FIG. 2.

FIG. 6 is a plan view of the rudder control taken along line 6—6 of FIG. 5(A).

DESCRIPTION OF A PREFERRED EMBODIMENT

Figure 4:
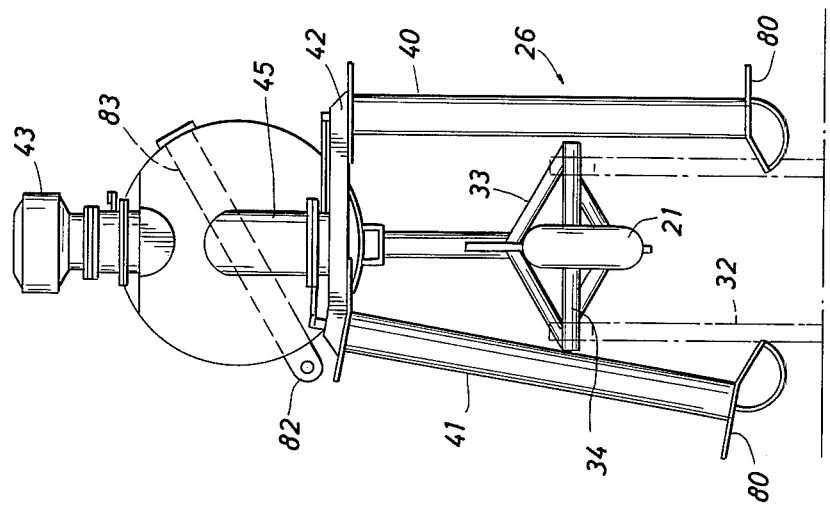
FIG. 4 is a front view of the array shown in FIG. 2.

Referring now to FIG. 1, there is shown a seismic survey vessel 10 having outriggers 11 and 12 and attached to each of the outriggers are seismic source arrays 13 and 16 constructed according to this invention. Two additional out-riggers are used for the arrays 14 and 15 that are towed behind the vessel. The arrays 13 and 16 are maintained in their desired position and towed along their proper course by the action of the water flow past the rudders and trailing edge flaps disposed on each array. The marine streamer containing the hydrophones is not shown in FIG. 1 but it would be towed directly behind the center of the survey vessel 10. Depending upon the length of the outriggers used with the arrays 14 and 15, it may be necessary to use rudders on these arrays to have them track along the desired course.

From the above description of a plan view it is seen that the four seismic source arrays provide a wide horizontal seismic source array. All of the arrays should be identical so that the signatures of the outgoing seismic wave produced by the arrays are identical. This greatly simplifies the subsequent processing of the seismic data. Further, the use of identical sources and spreading them a considerable distance apart as shown in FIG. 1 may permit an operator to obtain two or more lines of information from a single survey in those areas where horizontally travelling waves are not a problem. In this operation one could fire the sources in sequence from one side of the vessel to the other. Further, the use of identical arrays insures that if one array should fail or require retrieval for servicing, the vertical signature of the composite outgoing seismic wave would not be changed and thus the processing of the data would not have to be modified. This is not possible if the arrays are different where the loss of one array would change the vertical signature of the composite seismic wave.

While any desired horizontal spacing between the arrays may be used it has been found satisfactory in one prospect area to space the two inner arrays 50 feet from the center and each outer array 100 feet from its adjacent inner array. Likewise, while four arrays are shown, different numbers of arrays may be used. Further, it is preferable to make the arrays relatively short in-line, to maintain maximum band width of the desired seismic data.

Referring now to FIG. 2, there is shown an elevation view of the elongated float 20 and the supporting boom 21 for the seismic sources 22. Elongated float 20 has a general cylindrical shape which terminates in a streamlined leading edge to reduce the turbulence caused by towing the float through the water. The boom 21 is supported by chains 24 and 25 which suspend the boom a fixed distance below the float 20. Cables 29 and 29' are utilized in lifting the boom and the elongated float from the water to bring it aboard the survey vessel as a combined unit. As shown in FIG. 2, the cables extend upwardly to form a bridle for lifting the boom and float. The depth at which the boom member 21 is towed through the water can be adjusted by adjusting the length of the chains 24 and 25. The seismic sources 22 suspended below the boom are preferably air gun type sources which are actuated by applying compressed air and suitable firing signals thereto. The hoses and necessary wires for supplying the compressed air and firing signals are not shown in the attached drawings. Each of the air guns is supported below the boom by chains 23 which attach to a series of mounting brackets 28. The mounting brackets 28 have a series of holes formed therein so that the air guns may be located at various positions along the boom as desired. The chains 23 serve to provide flexibility between the boom and the air gun and reduce the shock produced in the boom and remainder of the system when the air guns are fired. While air guns are preferred, other types of seismic sources that do not require reloading after every actuation could also be used. For example, gas exploder type sources or other types of hydraulic or gas actuated sound sources may be used. It is also preferable to use an assortment of air guns of different sizes in forming the arrays to obtain a seismic pulse having the desired frequency content and shape. Of course, each array should have an identical assortment of sizes so that the pulses produced by the arrays are identical.

The elongated float is provided with a rudder arrangement 26 at its leading edge which will be described more fully below. Likewise, the boom 21 has a fin 27 at its trailing edge to stabilize its path. In addition, the boom is provided with support brackets 30 which have saddles 31 on their upper end which nest or mate with the bottom surface of the float 20 when the boom is lifted to the bottom of the float. Also suitable support members or pins 34 project outwardly from the boom which permit supporting the array from suitable mounting brackets 32 disposed on the deck of the survey vessel 10 as shown in FIGS. 3 and 4.

Figure 3:
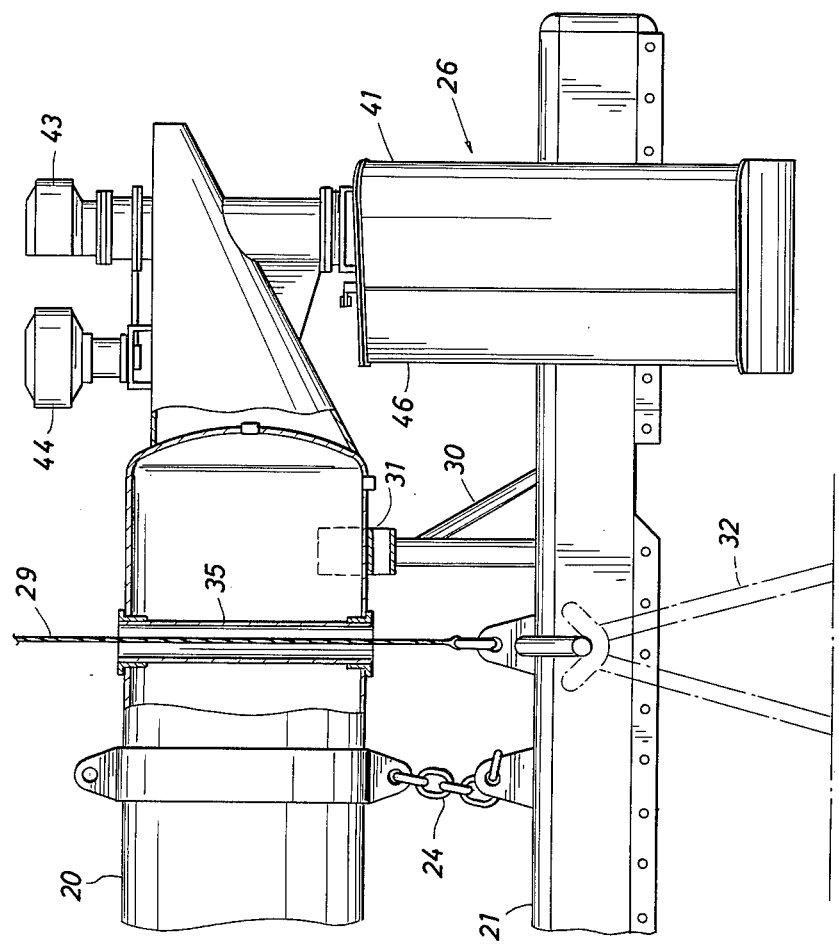
FIG. 3 is an enlarged elevation view of the front portion of the array shown in FIG. 2.

Referring now to FIGS. 3 and 4, there is shown the front portion of an array secured on the deck of the survey vessel. In this position the elongated float 20 rests on the saddles 31 supported by the brackets 30 on the boom member 21. Similarly, the horizontal pins 34 which project from the side of the boom 21 rest in suitable support brackets 32 on the deck of the vessel. The cables 24 and 25 pass up through suitable tubes 35 which are positioned in the tubular float members as shown in FIG. 3.

The rudder arrangement 26 comprises two separate rudders 40 and 41 which are suspended below a mounting bracket 42. The two rudders should be separated sufficiently to obtain efficient hydrodynamic thrust. The use of two rudders allows a compact arrangement that can be built as an integral part of the float so that no additional equipment is necessary. The compact arrangement also simplifies storage of the float, boom and sources on the survey vessel. As shown in FIG. 4, the rudder 40 has its elongated or pivotal axis substantially normal to the surface of the water when the float 20 is in its normal towing position. In contrast, the rudder 41 has its vertical or pivotal axis disposed at an angle to the surface of the water. Rudder 41 is designed to assume a vertical position when the float rotates in a counterclockwise direction. The float shown in FIG. 4 is the port side float and tends to rotate counterclockwise as it is towed through the water. This results from the horizontal force created by the water flow past the rudders. The float 16 is designed to be towed at a tow point 82 below the horizontal central axis. Of course, the array 13 should have its rudders and tow point disposed in the mirror image of those shown in FIG. 4.

The towing arrangement consists of a towing eye inserted in a reinforcing tube 83 that is located adjacent the forward end of the float. As shown in FIG. 4 the tube 83 projects downwardly so that the towing eye 82 is below the horizontal center axis of the float. This assists in counteracting the rotational effects of the rudders. The array 13 would have its towing eye located opposite to that for array 16. The support member 42 is attached to a member pivotally mounted inside of tube 45 to form the pivotal axis for the rudder assembly. The rudders are rotated by an actuater 44 while a second actuater 43 is used to control the positioning of the trailing edge flaps 46 shown in FIG. 3. Both of the rudders are provided with end plates 80 to increase their effectiveness.

The trailing edge flaps are of the split flap design that are simplier to construct and more rugged than extendable Fowler flaps. Of course, Fowler flaps would be more effective at low towing speeds of 1 to 2 knots. The type of flap used depends upon many factors and one skilled in the art can choose the best design after considering all factors.

Figure 5A:
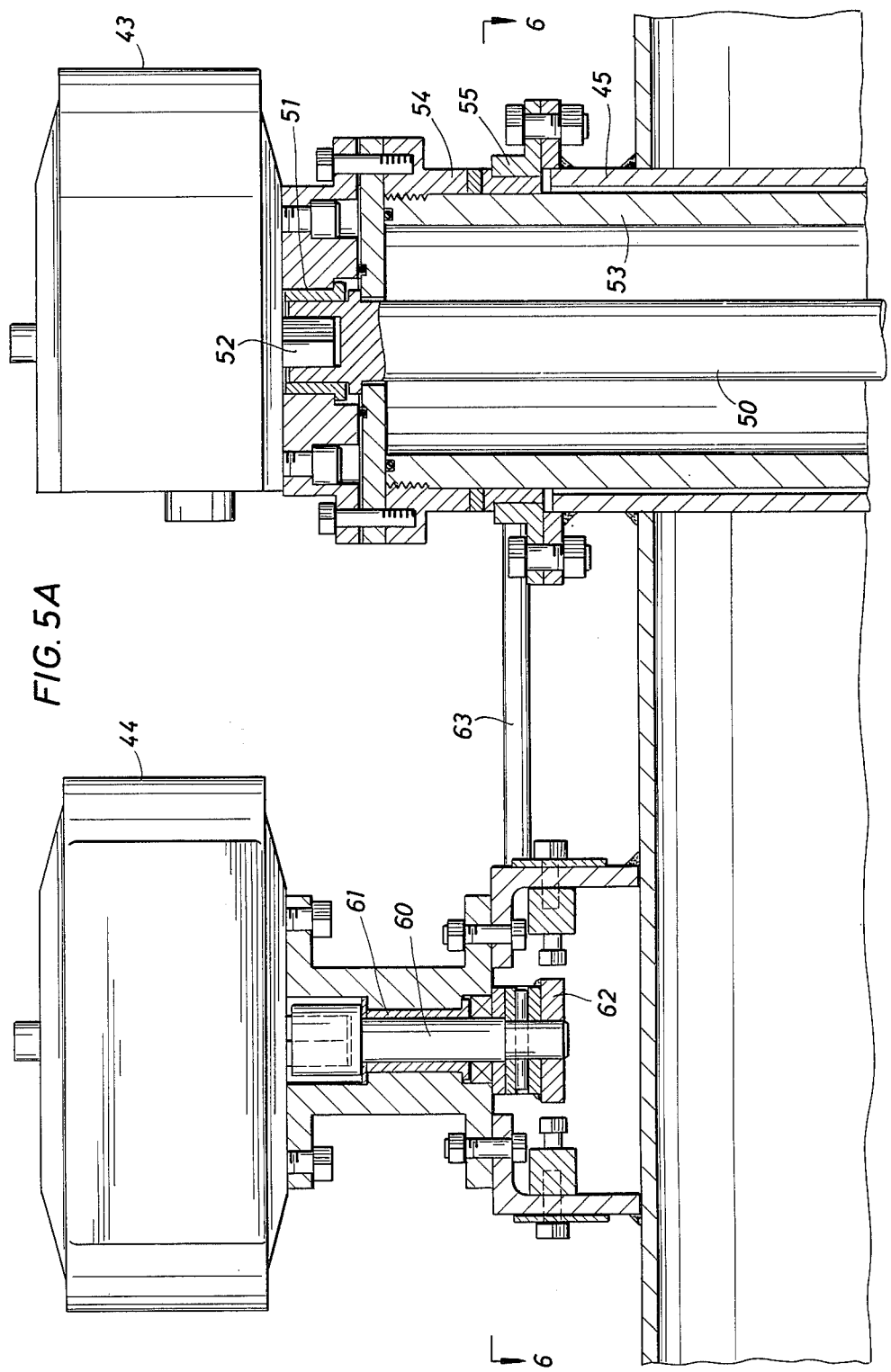
Figure 7:
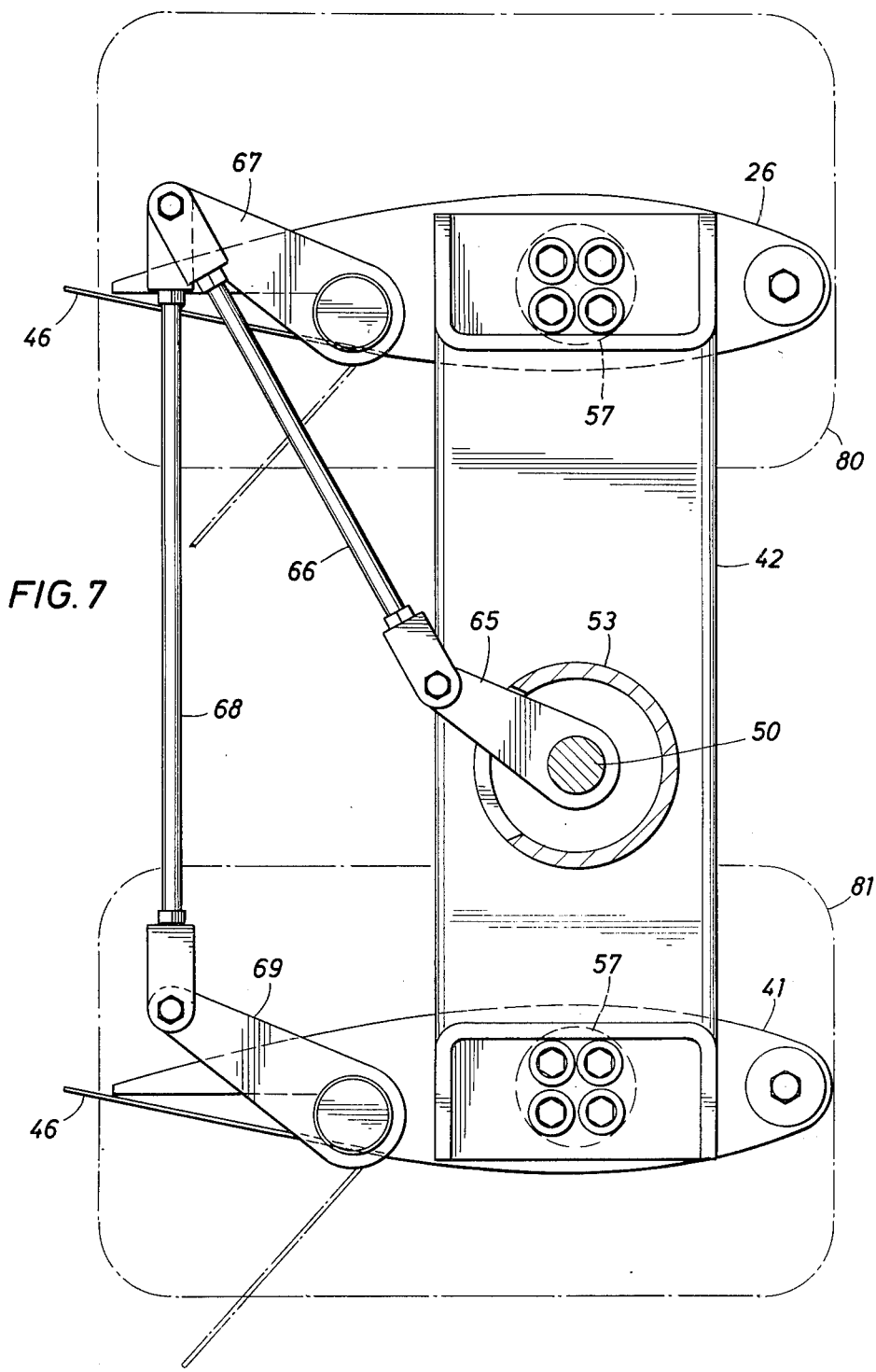
FIG. 7 is a plan view of the flap control taken along line 7—7 of FIG. 5(B).

Referring now to FIGS. 5(A) and 5(B), there is shown the detailed construction of the means used to both rotate the rudders and actuate the trailing edge flaps. In particular, the shaft 50 which is supported at its upper end by bearing 51 is used to rotate the trailing edge flaps. The shaft 50 is driven by the shaft 52 of the actuater 43. The bottom end of the shaft 50 as shown in FIG. 5(B) is pivoted in a bearing 56 mounted in the lower end of tube 53. The lower end of the shaft 50 connects to a bell crank 65 as shown in FIG. 7. The bell crank 65 connects with a rod 66 to actuate a bell crank 67 which is attached to the pivot shaft of the trailing edge flap 46, in FIG. 3. The trailing edge flap on the opposite or second rudder is actuated by the rod 68 which turns a bell crank 69 attached to the pivot of the trailing edge flap.

The rudders are rotated by the actuator 44 which is coupled to a shaft 60 journaled in a bearing 61. The lower end of the shaft 60 is attached to bell crank 62 as shown in FIG. 5A. Referring to FIG. 6 the bell crank 62 is coupled to a rod 63 which is attached to a bell crank 64 secured to the outer surface of the tubular member 53. Tubular member 53 acts as the rotating member of the rudder control system and is attached at its lower end to the rectangular shaped tubular member 42 support which forms the upper support for the rudders as shown in FIG. 4. As shown in FIG. 5B the tubular member 42 has a rudder post 57 attached to one end with a similar rudder post being attached to its opposite end. The rudder posts are secured to the rudders and rotate the rudders about the axis of the tubular member 53. The actuators 43 and 44 may be conventional air driven rotary actuators incorporating gear reductions if desired to increase their torque.

When the float member and its associated boom for supporting the sound sources is towed through the water their course and lateral position are determined by the position of the rudders 40 and 41. At the same time the flaps are used to increase the horizontal force created by the water flow past the rudders. The amount of flap extended can be remotely adjusted from the survey vessel to obtain sufficient rudder action to steer the float along its desired course while maintaining its desired lateral position. The rudders are also so used to steer the floats back to the survey vessel when recovering the float and boom members.

From the above description it can be appreciated that any desired lateral disposition of source arrays may be obtained. Both the spacing between the arrays as well as the overall lateral width may be adjusted by controlling the rudders.

What is claimed is:

1. A wide seismic source for towing by a vessel while conducting a marine survey comprising:

a plurality of elongated floats, a rudder means attached to the leading edge of each float, each of said rudder means comprising two separate rudders, one of said rudders being mounted with its vertical axis substantially normal to the surface of the water when said float is in its normal towed orientation, the second rudder being mounted with vertical axis at an angle to the rotational axis of said one of said rudders, the angle between the two rotational axes being chosen to position one of said rotational axes normal to the surface of the water when said float rotates when towed;

tow means attached to said floats and the vessel for towing said floats;

an elongated boom member suspended below each of said floats;

steering means disposed on said elongated floats to control said rudder means to maintain the floats in a desired lateral position with respect to the remainder of said floats;

a plurality of seismic sources attached to each elongated boom member; and, means for firing said seismic sources.

2. The wide seismic source of claim 1 wherein said float is an elongated cylinder.

3. The wide seismic source of claim 1 wherein said rudders are provided with trailing edge flaps.

4. The wide seismic source of claim 3 wherein said flaps are remotely controllable.

5. A seismic source for use in marine surveys comprising:

an elongated float;

an elongated boom member suspended below said float, at least one seismic source being attached to said boom member; and, a pair of rudders disposed on the leading end of said float one of said rudders having its vertical axis disposed substantially normal to the surface of the water when the float is in its normal towed position and the other rudder having its vertical axis an an angle to the rotational axis of said at least one rudder.

6. The seismic source of claim 5 wherein said rudders are mounted on a cross member and disposed to rotate about a single axis.

7. The seismic source of claim 5 or 6 and in addition said rudders being equipped with trailing edge flaps.

8. The seismic source of claim 7 wherein said flaps are disposed to be moved in unison.

9. The seismic source of claim 8 and in addition a pair of actuators, one of said actuators being disposed to rotate said rudders, the other of said actuators being disposed to operate said trailing edge flaps.

10. The seismic source of claim 5 wherein said float has a towing means located below the horizontal center of the float.

11. The seismic source of claim 10 wherein said towing means in addition is located to one side of the longitudinal axis of said float.

12. The seismic source of claim 5 wherein said rudders have a foil cross sectional shape.

13. The seismic source of claim 12 and in addition, said rudders having trailing edge flaps.

* * * * *